(12) United States Patent
Jennings et al.

(10) Patent No.: US 6,366,724 B1
(45) Date of Patent: Apr. 2, 2002

(54) INTEGRATED OPTICAL TRANSMITTER AND RECEIVER MODULE

(75) Inventors: Mark Richard Jennings, Andover; Frank Salvatore Leone, Berkeley Heights; Richard Joseph Pimpinella, Hampton, all of NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/432,057

(22) Filed: Oct. 30, 1999

(51) Int. Cl.[7] .................................................. G02B 6/26
(52) U.S. Cl. .............................. 385/48; 372/38; 372/29
(58) Field of Search .............................. 385/48; 372/38, 372/27, 6, 20; 359/110

(56) References Cited

U.S. PATENT DOCUMENTS 5,712,942 A * 1/1998 Jennings et al. ............ 385/134
6,049,506 A * 4/2000 White ........................ 385/12

* cited by examiner

Primary Examiner—Darren Schuberg
Assistant Examiner—Fayez Assaf
(74) Attorney, Agent, or Firm—Gibbons, Del Deo, Dolan, Griffinger & Vecchione

(57) ABSTRACT

The present invention is a module for use in an optical fiber administration system, or a dedicated system. The module contains both an optical transmitter and an optical monitor, wherein the module transmits a test signal over a fiber optic network and receives back that same signal through a different fiber in the fiber optic network. By both sending and receiving the test signal, the integrity of different paths in the optical fiber network can be determined in a space efficient manner. The module contains a microprocessor. The microprocessor reads data regarding the test signal as it is transmitted and that same test signal as it is received. This data may be read to an external shelf controller. The shelf controller utilizes the data from the microprocessor in the analysis of fiber optic loop conditions as well as the laser itself.

30 Claims, 5 Drawing Sheets

INTEGRATED OPTICAL TRANSMITTER AND RECEIVER MODULE

RELATED APPLICATIONS

This application is related to the following co-pending U.S. Patent Applications:

U.S. patent application Ser. No. 09/374,169, entitled, SYSTEM AND METHOD FOR MONITORING OPTICAL FIBER INTEGRITY BETWEEN THE TELECOMMUNICATIONS PROVIDER AND A CUSTOMER'S PREMISES, filed Oct. 13, 1999;

U.S. patent application Ser. No. 09/430,548, entitled, INTELLIGENT OPTICAL TRANSMITTER MODULE, filed Oct. 29, 1999; and U.S. patent application Ser. No. 09/430,640; entitled, MONITOR MODULE FOR A FIBER OPTIC MONITORING SYSTEM, filed Oct. 29, 1999, the disclosure of each of the above patent applications being incorporated herein by reference.

BACKGROUND OF THE INVENTION

1. Field of the Invention

The present invention relates to devices for transmitting and monitoring optical test signals through an optical fiber network. More particularly, the present invention relates to single devices that both transmit an optical test signal through a first optical fiber and receive that same test signal through a second optical fiber for analysis of the optical fibers through which the optical test signal travels.

2. Description of the Prior Art

There are many applications that utilize an optical fiber network to establish optical communications between a host digital terminal (HDT) at a central office and an optical network unit (ONU) at a remote location. Since a central office serves as the point of origin for the optical fibers in the optical fiber network, equipment is used at the central office to organize various optical fibers in the optical fiber network. In certain optical networks, the optical fibers at the central office are connected to dedicated pieces of equipment, such as optical signal transmitters, that serve only one purpose. If the optical fibers are to be connected to another piece of equipment, such as test equipment, the optical fibers must be manually connected to that new piece of equipment.

In more sophisticated applications, optical fibers are terminated at fiber administration systems at the central office. Fiber administration systems enable many different types of equipment to be connected to the optical fibers without having to reroute the optical fibers from their point of termination.

In many fiber administration systems, as the optical fibers in a network enter the central office, they are directed into an optical distribution frame where the individual optical fibers are terminated in an organized manner. Such fiber administration systems are exemplified by the LGX® fiber administration system which is currently manufactured by Lucent Technologies of Murray Hill, N.J., the assignee herein.

Each optical distribution frame located at the central office typically defines a plurality of bays, wherein each bay houses several different types of dedicated equipment shelves. One type of dedicated equipment shelf contained within a fiber distribution system is a fiber distribution shelf. Located within the fiber distribution shelves are optical connection ports that receive the ends of all of the individual optical fibers that enter the central office and are contained within the optical fiber network. By terminating each optical fiber at an optical connection port on one of the different fiber distribution shelves, the location of each optical fiber becomes known within the overall assembly. Once terminated at a known address on one of the fiber distribution shelves, each optical fiber can be selectively coupled to a variety of other types of equipment contained within other shelves of the fiber distribution system.

At the opposite end of the various optical fibers are the customers of the telecommunications provider. For customers having smaller scale telecommunications needs, the optical signals transmitted on the optical fiber network are converted to electrical signals, prior to termination of the customer premises in a traditional manner. As such, the entire optical network is controlled and maintained by the telecommunications provider. However, with customers that have large-scale telecommunication requirements, it is not uncommon for the telecommunications provider to run a pair of optical fibers from the optical network directly into the customer premises. One fiber is used to receive signals from the telecommunications provider and the other fiber is used to send signals to the telecommunications provider.

With customers that receive dedicated optical fiber pairs from their telecommunications provider, all incoming and outgoing transmissions are directed through these optical fibers. Accordingly, to disconnect either of these optical fibers is to completely disrupt the telecommunications service to that customer.

When a customer reports trouble with telecommunications transmissions, the problem can be either related to the optical fibers owned by the telecommunications provider or the telecommunications equipment owned by the customer. Since the optical fiber leading to the customer premises cannot be disconnected, it is difficult to pinpoint whether a problem is contained in the telecommunication provider's equipment or the customer's equipment. The result is that a technician from the telecommunications provider must be dispatched to the customer premises and time consuming manual tests must be conducted to locate the exact point of the problem.

In addition to monitoring and testing optical fibers leading to a specific customer premise, it may also be desirable to monitor and/or test newly deployed optical cables as well as other fiber optic cables routed between other locations in an optical fiber communications network.

The testing and monitoring of optical fibers also requires the deployment of a stable optical light source, i.e., a laser, which is typically embodied in a cumbersome piece of test equipment. Output levels of the laser are typically measured via a backface monitoring technique, as would be understood to persons skilled in the art. A drawback to tracking the output laser power using only the backface monitoring technique is that this technique does not always accurately reflect the laser power which has been output over the optical fiber. This may be due, for example, to temperature variations between the optical fiber and the laser apparatus which can cause slight misalignments to occur between the optical fiber and the laser, which is sometimes referred to as creeping.

A need therefore exists for equipment that can be used to test the integrity of an optical fiber pair leading to a specific customer premises from a remote location, thereby improving the efficiency by which a line error can be located.

SUMMARY OF THE INVENTION

The present invention is a module for use in an optical fiber administration system, or a dedicated system. The module contains both an optical transmitter and an optical monitor, wherein the module transmits a test signal over a fiber optic network and receives back that same signal through a different fiber in the fiber is optic network. By both sending and receiving the test signal, the integrity of different paths in the optical fiber network can be determined in a space efficient manner.

The module contains a microprocessor. The microprocessor reads data regarding the test signal as it is transmitted and that same test signal as it is received. This data may be read to an external shelf controller. The shelf controller utilizes the data from the microprocessor in the analysis of fiber optic loop conditions as well as the laser itself.

BRIEF DESCRIPTION OF THE DRAWINGS

For a better understanding of the present invention, reference is made to the following description of exemplary embodiments thereof, considered in conjunction with the accompanying drawings, in which.

DETAILED DESCRIPTION OF THE DRAWINGS

Figure 1:
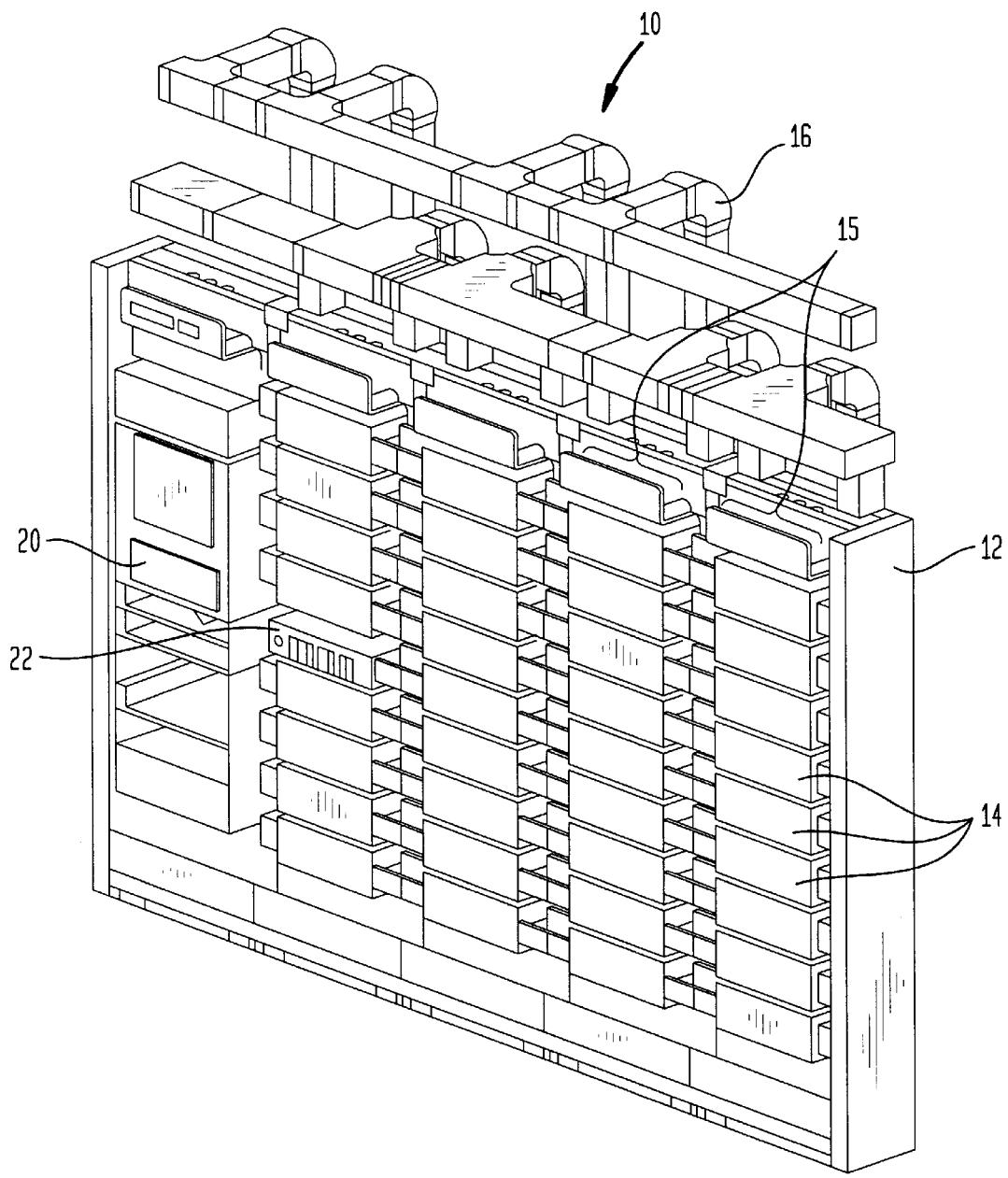
FIG. 1 is a perspective view of an optical fiber administration system containing a first plurality of bays and a second plurality of shelves in each bay.

In FIG. 1, a fiber administration system 10 is shown. The exemplary fiber administration system 10 includes an optical fiber distribution frame 12 that is affixed in a set position to the floor of a central office. The fiber distribution frame 12 defines a plurality of bays 15. Each bay 15 is a vertical structure that supports a plurality of different shelves 14. The different shelves 14 come in one of three standard sizes, having a five inch height, a seven inch height or a nine inch height. A network of conduits 16 lead the various optical fibers from the optical fiber network to the fiber distribution shelves 14. Contained within those conduits 16 are the different dedicated pairs of optical fibers that are dedicated to different customer facilities.

In addition to the different shelves, the fiber administration system also includes a systems controller 20. The systems controller 20 runs the software that controls the fiber administration system 10.

Contained within the fiber administration system 10 is at least one monitoring shelf 22 which may include monitoring equipment such as the intelligent optical transmitter module of the present invention.

Figure 2:
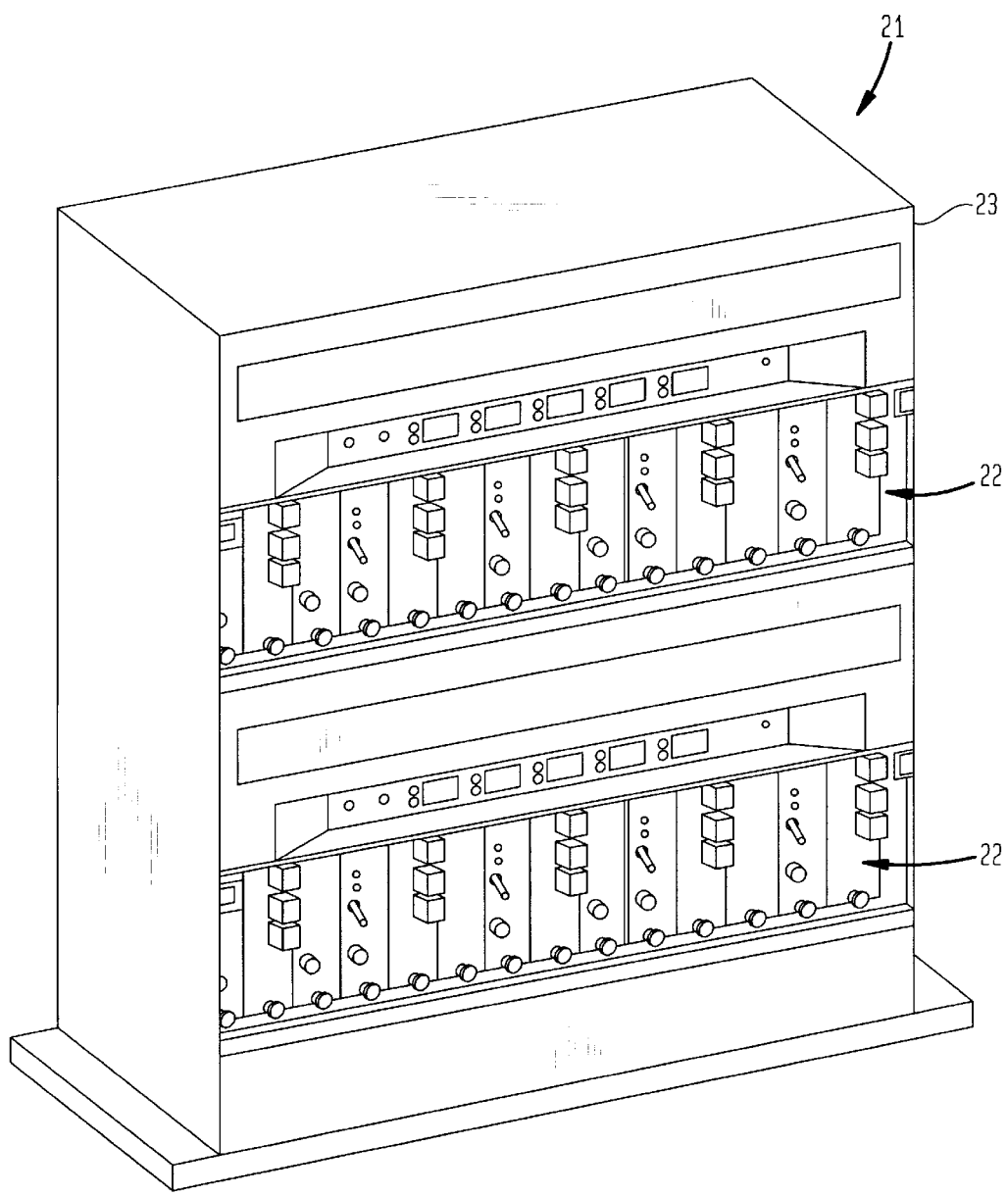
FIG. 2 is a perspective view of a dedicated piece of equipment containing monitor shelves.

Not every optical fiber system uses a fiber administration system such as that shown in FIG. 1. Accordingly, in such systems, monitoring shelves cannot be simply added to the structure of the fiber administration system. In such applications, the monitoring shelves can be built into a self-contained piece of equipment. Referring to FIG. 2, such a dedicated piece of equipment 21 is illustrated. In FIG. 2, a small frame 23 is provided. The small frame 23 retains at least one monitoring shelf 22. In optical fiber networks that do not use fiber administration systems, the small frame 23 can be brought into the telecommunication provider's facility and the optical fibers of the optical fiber network can be manually interconnected with the monitoring shelves 22.

As stated previously, the monitoring shelves may include monitoring equipment such as the combined optical transmitter and monitor test module 24 which is the subject of the present invention. Other monitor modules may be deployed as well to receive transmissions from other optical transmitter modules.

Figure 3:
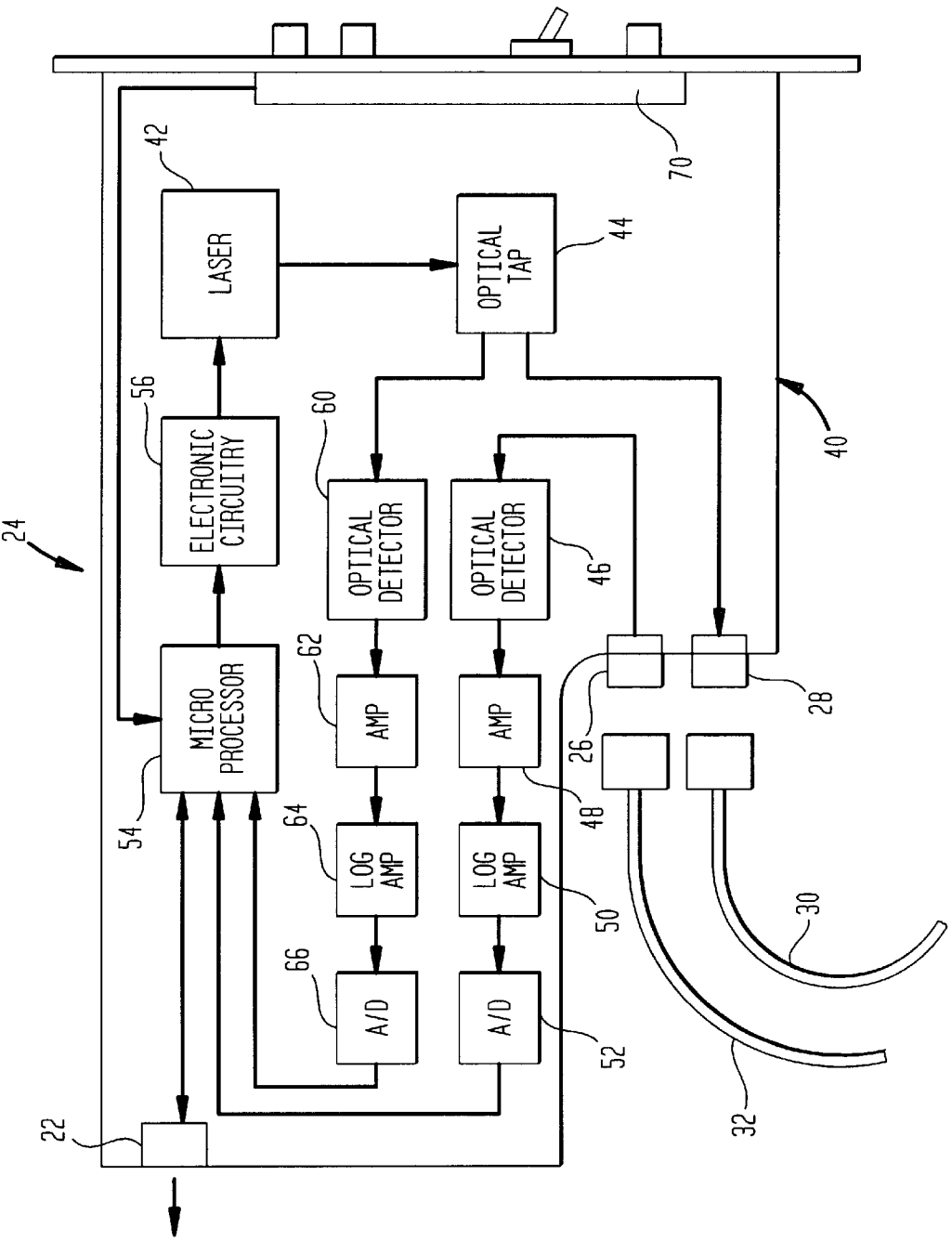
FIG. 3 is a schematic view of an exemplary embodiment of a module in accordance with the present invention.

The structure of the test module 24 is best described by now referring to FIG. 3. In FIG. 3, it can be seen that the test module 24 is contained within a module housing 40. The module housing 40 is sized to fit within the monitoring shelf 22 (FIG. 2) within the fiber administration system 10 (FIG. 1). When viewed from the side, the modular housing 40 is generally rectangular in shape having a relief at the lower rear corner of the rectangle. Both input connector port 26 and the output connector port 28 enter the modular housing 40 within the area of the relief. The area of the relief is required to provide the incoming optical fibers 30, 32 the needed room to curve and engage the optical connector ports 26, 28 within the confines of the monitoring shelf 22 (FIG. 2).

Each test module contains a solid state laser 42. The output of the solid state laser is directly coupled to the output connector port 28 of the test module 24. An optical tap 44 is disposed between the solid state laser 42 and the output connector port 28. The optical tap 44 directs a small portion of the optical energy from the output of the solid state laser 42 to a first optical detector 60.

The first optical detector 60 creates an analog electrical signal in response to the light received from the optical tap 44. The analog electrical signal is passed through both a pre-amplifier 62 and a logarithmic amplifier 64 to both amplify and linearize the analog electrical signal. The analog signal is then converted to a digital signal using an analog-to-digital converter 66.

A microprocessor 54 is contained within the test module 24. The microprocessor 54 receives digital signals from the analog-to-digital converter 66. As such, the microprocessor 54 is capable of directly monitoring the output of the solid state laser 42 in real time.

The input connector port 26 of the test module 24 is coupled to a second optical detector 46. The optical detector 46 creates an analog electrical signal that corresponds to the optical test signal. The analog electric signal is passed through both a pre-amplifier 48 and a logarithmic amplifier 50 to both amplify and linearize the analog electrical signal. The analog electrical signal is then converted to a digital signal using a second analog-to-digital converter 52.

The test module microprocessor 54 receives digital signals from the second analog-to-digital converter 52. As such, the microprocessor 54 is capable of directly monitoring the optical test signal as it is received at the input connector port 26.

The microprocessor 54 within the test module 24 is also coupled to electronic control circuitry 56 of the solid state laser 42. As such, the microprocessor 54 is capable of controlling the operational power of the solid state laser 42, and thus the output power of the solid state laser 42. The present invention offers an advantage over the prior art in that it is capable of measuring not only the backface monitor power, but also the coupling power which is output from the laser 42. This is important because through these monitoring capabilities, a constant output power level from the module can be guaranteed. Accordingly, if the output levels of the laser are precisely known, and a problem occurs with a transmission in an optical fiber, then the problem can be easily isolated to either the fiber optic cable or the laser mechanism.

Figure 4:
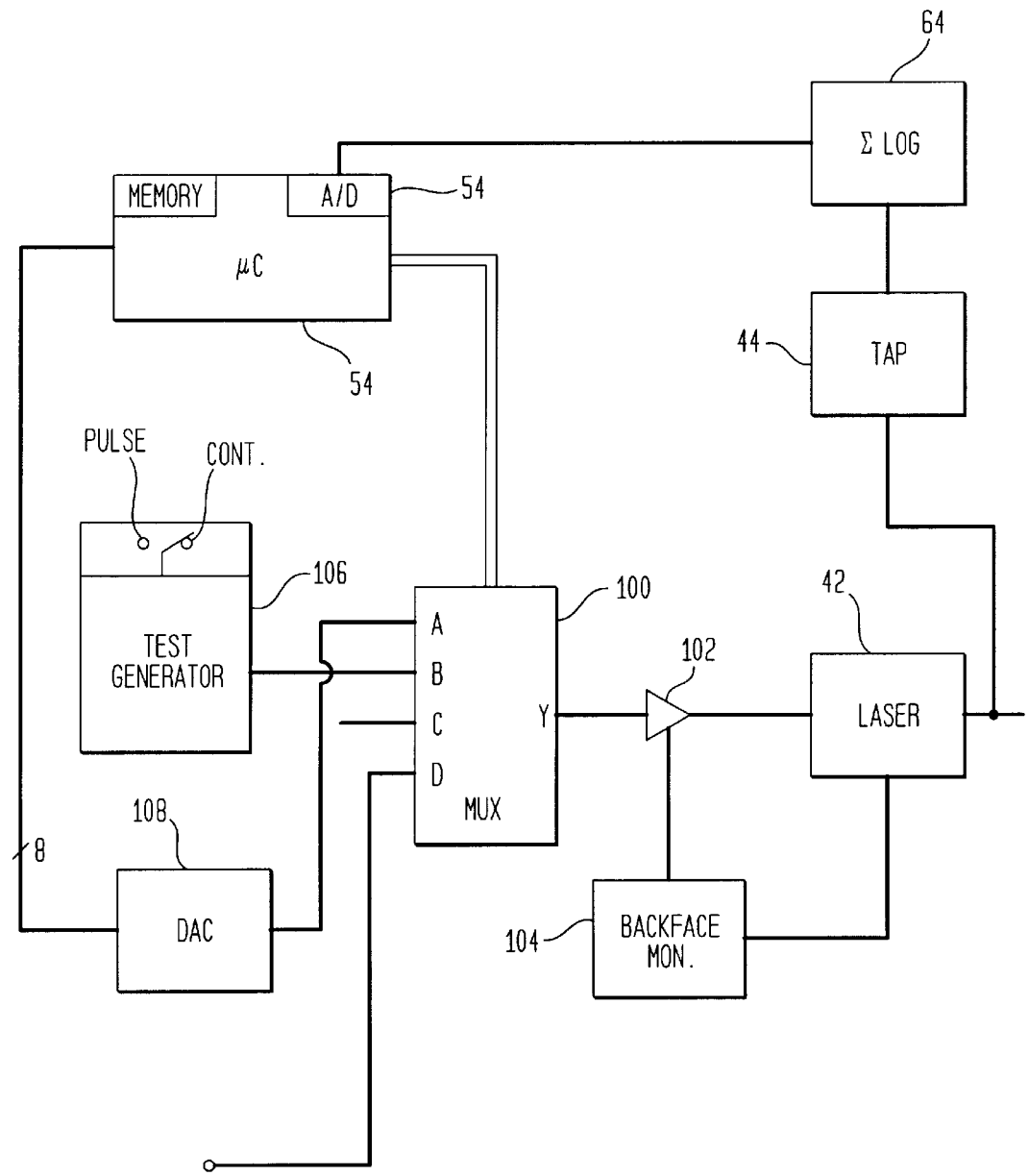
FIG. 4 is a more detailed schematic view of an exemplary embodiment of the optical transmitter portion of the module in accordance with the present invention.

Referring to FIG. 4, a functional block diagram of the optical transmitter portion of the test module is shown, wherein the electronic control circuitry 56 of the module is shown in greater detail. As shown, the microprocessor 54 is coupled to a multiplexer device 100 which in the exemplary embodiment is capable of selecting one of four inputs A,B,C,D to be included on output line Y. Output line Y is coupled to an amplifier 102 which in turn has its output coupled to the laser 42. A backface monitor circuit 104 couples to the amplifier 102 and to the laser 42 in order to monitor the backface monitor output power of the laser 42. As discussed previously, the backface monitor circuit 104 may also be coupled directly to the microprocessor 54 in order to monitor and/or modify output power levels of the laser 42.

The multiplexer 100 of the electronic control circuitry includes four inputs, although a person skilled in the art would recognize that any number of multiplexer inputs can be utilized. As shown, input B of the multiplexer 100 is coupled to a test signal generator 106, for example to produce a 2 kHz test signal, which when selected is output from the laser and in turn the test module. The test signal generator 106 can be directed by the microprocessor to output either a pulsed or continuous wave test signal. Input C of the multiplexer 100 when selected directs the laser to output continuous wave full power.

Input A of the multiplexer couples to the microprocessor through a digital to analog converter (DAC) 108. The DAC 108, based on the digital input from the microprocessor, is capable of outputting a large number of precisely varying output levels, e.g. $2^8$, to the multiplexer in order to control the output power of the laser 42. In this way the output power of the laser 42 can be specifically tailored to the receiving electronics without the use of attenuators. Input D of the multiplexer couples to an input port on the module 24 which can accept an external input signal for transmission over the fiber cable. In this way, the test module 24 may be used in a communication mode as well as a test and monitor mode.

As a result of the monitoring capabilities of the microprocessor 54, the test module 24 is capable of producing alarms in response to the laser output level falling below a given threshold level. The module produces a local visual and/or audible alarm as well as an alarm message to be transmitted to a systems controller 20 if the module is used within a fiber administration system. As would be understood, since the output power levels of the module are adjustable, the alarm threshold is also adjustable. The optical output monitoring capability of the module as performed by the microprocessor is additionally useful in that statistical information regarding the laser's output may be compiled for processing by, for example, the fiber administration system. Such statistical processing is valuable for use in analysis of event occurrences within the fiber optic communications network and can also be used to predict the life of the laser itself.

An additional feature of the intelligent optical transmitter module 24 is that through the inclusion of non-volatile memory, e.g., EEPROM or other like ROM or RAM device understood to a person skilled in the art, which is factory pre-programmed, the modules are made to be ▓ self aware ▓ upon initial power up. That is, individual modules are given an identity at the factory which may include, among other things, module type, code version, serial number, manufacturing date, firmware version, connector type, calibration data, wavelength data and number of channels data. Accordingly, when used in a compatible fiber administration system, the module will be automatically identified to the system controller or shelf controller upon initial power up and after any power outages or subsequent power ups.

As discussed, the test module 24 also performs a real time optical power monitoring function. After the monitor module is powered up for a given time period and is receiving a test signal, from a test signal from the transmitter portion of the module for example, an initialize command originating from the systems controller directs the microprocessor to store the current average optical power reading as a reference value to which all subsequent readings are compared. If the optical power changes by more than a predetermined threshold, for example 3 dB, the module is programmed to alarm. More specifically, the module's alarm circuitry includes a built-in hysteresis function so as to limit false alarming. An optical power variation (or threshold variation) of more than 3 dB results in what is referred to as a "major" alarm. If the optical power drops below the module's measurement sensitivity, the module generates a "critical" alarm, usually signifying a fiber outage. Critical alarms normally result if the fiber path is disrupted or cut. A flashing "fault" LED or other indicator on the module 24 indicates an alarm condition.

When used in conjunction with a fiber administration system, the monitor module 24 transmits optical power measurements to a test system controller 20 (FIG. 1) of the fiber administration system approximately once every minute. Optical performance data is logged for each fiber path and can be graphically displayed. Statistical performance data is available for hourly, daily, weekly and annual measurement intervals. User selectable thresholds can be set to alarm on deviations in optical power or changes in power level stability for each measurement interval. In general, the monitor module monitors the incoming power at 100 millisecond intervals. Every 15 seconds, the samples are taken and fed to the microprocessor for statistical analysis. Examples of the samples which are taken and then processed include a running sum of the samples and running sum of the samples squared (sample$^2$). These specific samples are useful for statistical analysis of the source and would be necessary for calculation of average power and associated standard deviation calculations. Other samples which would be apparent to a person skilled in the art are able to be read in order to perform long and short term statistical analysis.

Referring to FIG. 3, it will be understood that since the microprocessor 54 both monitors the output of the solid state laser 42 and controls the output of the solid state laser 42, the microprocessor 54 can make active changes to the solid state laser 42 that cause the solid state laser to operate at its optimum level in a feedback type fashion. For example, if the solid state laser 42 has a certain acceptable range of operational power, the microprocessor 52 can cause the laser to operate at the midpoint of that range regardless to changing operational variables, such as operational temperature.

Since the microprocessor 54 controls the input power of the solid state laser 42 and measures the output power of that laser 42, the microprocessor 54 is capable of determining the efficiency of the laser 42. Similarly, the microprocessor 54 can determine the degree of degradation in a signal caused by the laser 54 itself. If the solid state laser 42 fails or if the performance of the laser 42 falls below outside a predetermined range, the microprocessor 54 immediately senses the condition and signals an alarm.

The microprocessor 54 is coupled to a connector port 68 on the module housing 40. The shelf controller 33 (FIG. 5) connects to the connector port 68 of the test module 24, thereby creating a direct link between the shelf controller 30 and the microprocessor 54 within the test module 24. The shelf controller 31 (FIG. 5) can therefore read data from the microprocessor that represents the data from the test signal being sent out the output port 28 and data received through the input port 26 of the test module 24. As this data is read to the shelf controller 33 (FIG. 5), the systems controller 31 can monitor the performance of the test module 24 itself and can monitor the integrity of the optical fibers 30, 32 connected to the test module.

The test module 24 also contains a manual control interface 70. The manual control interface 70 contains various buttons and switches that enable the test module 24 to be activated and controlled manually by a technician. The manual control interface 70 is connected to the microprocessor 54. The microprocessor 54 is connected to the shelf controller 33 (FIG. 5), through the connector port 68 at the rear of the test module 24. Accordingly, the manual control interface 70 can be controlled through the microprocessor 54. The shelf controller 33 can therefore be used to deactivate the manual control interface to prevent tampering with the test module 24.

As was mentioned previously, the test module of the present invention may be used within a fiber administration system 10 of the type described in FIG. 1. In that case, the test module 24 and other associated modules may be controlled by the systems controller 20 of the fiber administration system 10. This further allows data collected at the transmitter module to be transmitted to and processed by the systems controller for use by the fiber administration system. Accordingly, this provides a means of collecting and correlating information with regard to individual fibers which are coupled to the fiber administration system. As discussed, this information may be used to provide statistical analysis with respect to individual communications channels. In addition, when the transmitter module is used with a fiber administration system, certain modules may be physically located at the fiber administration system while other modules may be remotely located, e.g., the monitor modules. In this case, the information which is collected at the remote location may be transmitted back to the fiber administration system in a client server type fashion in which case client server type communication devices would be utilized in order enable communications between the two locations.

Figure 5:
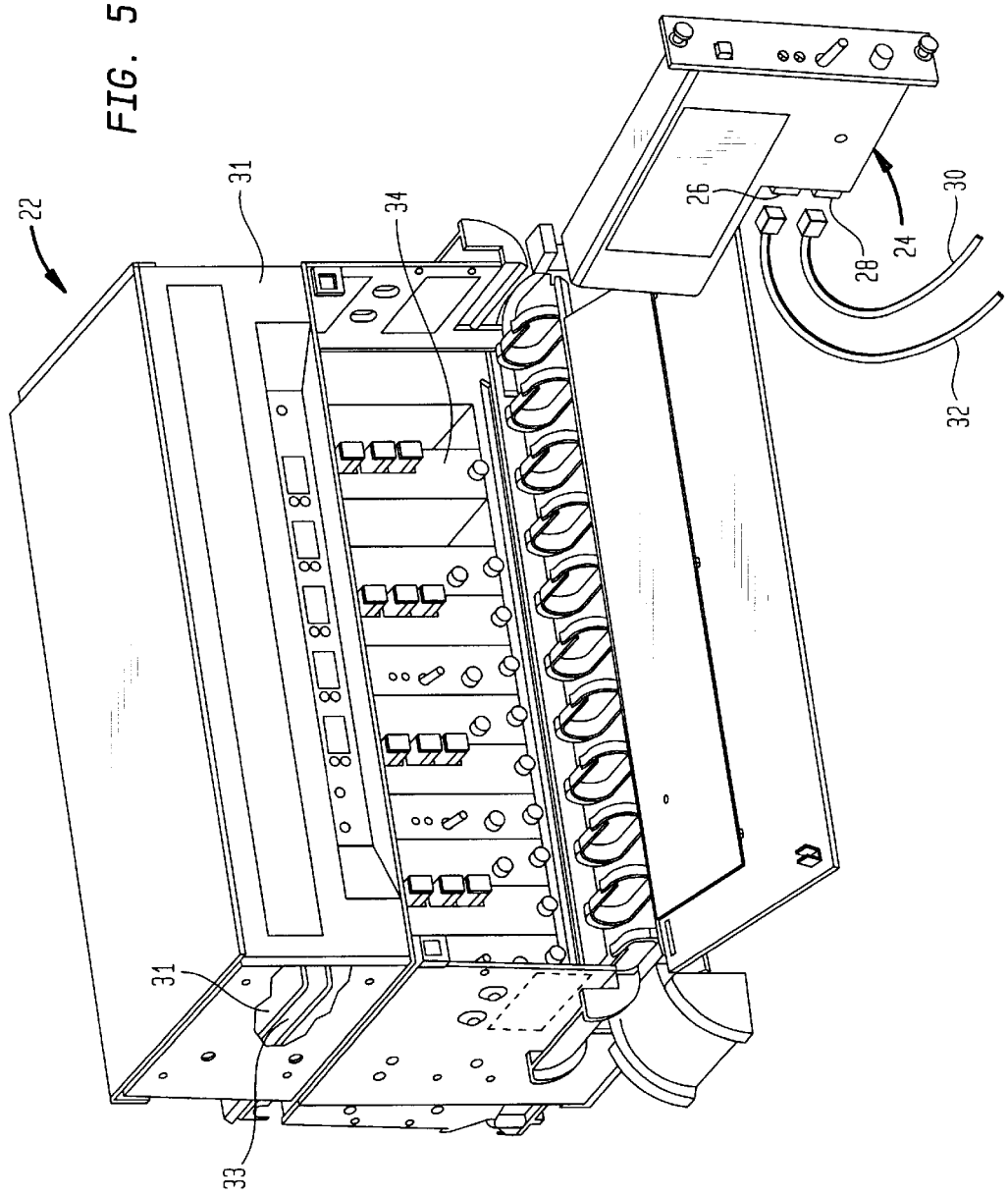
FIG. 5 is an exploded view of monitoring shelf containing an exemplary embodiment of the present invention module.

One application for use of the intelligent test module 24 of the present invention is for loop back monitoring of a fiber line to customer premises equipment. In such applications, the loop back monitoring shelves can be built into a self-contained piece of equipment. Referring to FIG. 5, such a dedicated piece of equipment 21 is illustrated. In FIG. 5, a small frame 23 is provided. The small frame 23 retains at least one loop back monitoring shelf 22. In optical fiber networks that do not use fiber administration systems, the small frame 23 can be brought into the telecommunication provider's facility and the optical fibers of the optical fiber network can be manually interconnected with the loop back monitoring shelves 22.

Regardless of whether the loop back monitoring shelves are part of a larger fiber administration system or are self-contained, the function and structure of the loop back monitoring shelves remains the same. Referring to FIG. 5, it can be seen that the loop back monitoring shelf 22 supports a plurality of test modules 24. The test modules 24 contain two optical connector ports, which include an input connector port 26 and an output connector port 28. The output connector port 28 connects to an optical fiber 30 that sends signals to a specific customer premises. The input connector port 26 connects to the optical fiber 32 that receives signals from that same customer premises.

The loop back monitoring shelf 22 contains a system controller 31. The shelf controller 33 is a programmable computer control that is compatible with the systems controller 20 (FIG. 1) of the overall fiber administration system 10 (FIG. 1). The shelf controller 33 gathers information from the test modules 24 for use in statistical analysis and the continued operation of the loop back monitoring shelf 22 within the fiber administration system 10 (FIG. 1).

For each dedicated optical fiber pair 30, 32, that is joined to the loop back monitoring shelf 22, both a single test module 24 and a wavelength division multiplexing module 34 are provided. The overall loop back monitoring system is disclosed in related co-pending U.S. patent application Ser. No. 09/374,169, entitled, System And Method For Monitoring Optical Fiber Integrity Between The Telecommunications Provider And A Customer's Premises.

It will be understood that the embodiment of the present invention system and method specifically shown and described is merely exemplary and that a person skilled in the art can make alternate embodiments using different configurations and functionally equivalent components. All such alternate embodiments are intended to be included in the scope of this invention as set forth in the following claims.

What is claimed is:

1. An assembly comprising:
   a laser for providing an optical output signal that is transmitted through an optical output port;
   a first optical monitor for monitoring said optical output signal;
   a second optical monitor for monitoring an incoming optical signal received through an optical input port; and
   a microprocessor connected to both said first optical monitor and said second optical monitor.

2. The assembly according to claim 1, further including a backface monitor circuit for monitoring said output signal produced from said laser, said backface monitor circuit being coupled to said microprocessor.

3. The assembly according to claim 1, further including an optical tap for tapping a portion of said optical output signal as said optical output signal travels from said laser to said optical output port.

4. The assembly according to claim 3, wherein said tap couples said portion of said optical output signal to said first optical monitor.

5. The assembly according to claim 1, wherein said first optical monitor produces a first analog electrical signal that corresponds to said optical output signal, and said second optical monitor produces a second analog electrical signal that corresponds to the incoming optical signal.

6. The assembly according to claim 5, further including logarithmic amplifiers, coupled to said first optical monitor and said second optical monitor for linearizing said first analog electrical signal and said second analog electrical signal, respectively.

7. The assembly according to claim 6, further including analog-to-digital converters, coupled to said logarithmic amplifiers and said microprocessor, wherein said analog-to-digital converters convert said first analog electrical signal and said second analog electrical signals into digital signals that are read by said microprocessor.

8. The assembly according to claim 1, further including an electrical connector port, wherein said electrical connector port is coupled to said microprocessor.

9. The assembly according to claim 8, further including manual controls wherein said manual controls are coupled directly to said electrical connector port.

10. The assembly of claim 1, wherein output power levels of said laser are adjustable as selected by said microprocessor.

11. The assembly of claim 10, further including a multiplexer circuit coupled to said microprocessor for selecting one of a number of inputs to control the output of said laser.

12. The assembly of claim 11, further including a digital to analog converter coupled between said microprocessor and one input of said multiplexer for controlling output power levels of said laser.

13. The assembly of claim 11, wherein said inputs are selected from the group comprising test signal generator, digital to analog converter, full power indicator and external input.

14. The assembly of claim 1, further including a memory element for storing identity parameters, wherein said transmitter module outputs said identity parameters upon being powered.

15. In a fiber administration system having a plurality of different modules, a combined transmission and monitoring module comprising:
    a laser for producing an optical signal that is emitted out of an optical output port;
    a first optical detector that detects an optical signal received through an optical input port; and
    a microprocessor that monitors said optical signal produced by said laser and the optical signal detected by said first optical detector.

16. The module according to claim 15, further including an optical monitor for monitoring said optical signal produced by said laser.

17. The module according to claim 16, wherein said microprocessor adjusts said laser in response to said optical signal detected by said optical monitor.

18. The module according to claim 17, further including an optical tap for tapping a portion of said optical signal as it travels from said laser to said optical output port.

19. The module according to claim 18, wherein said tap couples said portion of said optical signal to said optical monitor.

20. The module according to claim 16, wherein said optical monitor produces a first analog electrical signal and a second optical monitor produces a second analog electrical signal in response to the optical signal received through said optical input port.

21. The module according to claim 20, further including logarithmic amplifiers, coupled to said optical monitor and said second optical monitor for linearizing said first analog electrical signal and said second analog electrical signal, respectively.

22. The module according to claim 21, further including analog-to-digital converters, coupled to said logarithmic amplifiers and said microprocessor, wherein said analog-to-digital converters convert said first analog electrical signal and said second analog electrical signals into digital signals that are read by said microprocessor.

23. The module of claim 15, wherein output power levels of said laser are adjustable as selected by said microprocessor, further including a multiplexer circuit coupled to said microprocessor for selecting one of a number of inputs to control the output of said laser.

24. The module of claim 23, further including a digital to analog converter coupled between said microprocessor and one input of said multiplexer for controlling output power levels of said laser.

25. The module of claim 23, wherein said inputs are selected from the group comprising test signal generator, digital to analog converter, full power indicator and external input.

26. The module of claim 15, further including a memory element for storing identity parameters, wherein said module outputs said identity parameters upon being powered.

27. The module of claim 15, wherein said module communicates with a systems controller of said fiber administration system.

28. A fiber administration system for an optical fiber network, comprising:
    at least one optical transmitter, wherein each optical transmitter is optical coupled to one end of a loop optical fiber pathway in the optical fiber network, and wherein said optical transmitter transmits an optical test signal into said looped optical fiber pathway of the optical fiber network;
    at least one optical monitor, wherein each optical monitor is optically coupled to an opposite end of said looped optical fiber pathway and wherein said optical monitor detects said optical test signal after said optical test signal has passed through said looped optical fiber pathway, and
    circuitry for monitoring both said optical transmitter and said optical monitor.

29. The system according to claim 28, further including a shelf controller coupled to said monitoring circuitry.

30. An assembly comprising:
    an optical signal source for providing an optical output signal that is transmitted through an optical output port;
    monitoring circuitry for monitoring said optical output signal and an incoming optical signal through an optical input port; and
    circuitry connected to said monitoring circuitry and responsive to said optical output signal and said optical input signal.

* * * * *